(12) United States Patent
Hetzer et al.

(10) Patent No.: US 8,208,780 B2
(45) Date of Patent: Jun. 26, 2012

(54) STRAIN RELIEF APPARATUS

(75) Inventors: Ulrich Hetzer, Berlin (DE); Pia Kopf, Berlin (DE)

(73) Assignee: ADC GmbH, Berlin (DE)

( * ) Notice: Subject to any disclaimer, the term of this patent is extended or adjusted under 35 U.S.C. 154(b) by 272 days.

(21) Appl. No.: 12/479,937

(22) Filed: Jun. 8, 2009

(65) Prior Publication Data
US 2009/0304343 A1    Dec. 10, 2009

(30) Foreign Application Priority Data
Jun. 9, 2008    (DE) .................. 10 2008 027 380

(51) Int. Cl.
*G02B 6/00*    (2006.01)
(52) U.S. Cl. ........................................ 385/135
(58) Field of Classification Search .................... 385/135
See application file for complete search history.

(56) References Cited

U.S. PATENT DOCUMENTS

| | | | |
|---|---|---|---|
| 6,263,143 B1 * | 7/2001 | Potteiger et al. | 385/135 |
| 6,856,747 B2 * | 2/2005 | Cloud et al. | 385/135 |
| 2003/0095773 A1 * | 5/2003 | Ichinari et al. | 385/135 |
| 2006/0285811 A1 | 12/2006 | Kowalczyk | |
| 2007/0036506 A1 * | 2/2007 | Kewitsch | 385/135 |

FOREIGN PATENT DOCUMENTS

| | | |
|---|---|---|
| DE | 93 02 960.8 | 4/1993 |
| GB | 2 042 817 | 9/1980 |
| GB | 2 222 698 | 3/1990 |

* cited by examiner

*Primary Examiner* — Eric Wong
(74) *Attorney, Agent, or Firm* — Merchant & Gould P.C.

(57) ABSTRACT

The invention relates to a strain relief apparatus (50) for cables, in particular for fiberoptic cables with Kevlar fibers, the strain relief apparatus (50) being designed to have at least two parts and having an outer part (30) and an inner part (10), the inner part (10) having a receptacle for inserting at least part of the cable, in particular the Kevlar fibers, and a winding region (12), the inner part (10) being designed to be capable of rotating with respect to the outer part (30), the strain relief apparatus (50) having a stop (43, 44; 45, 46) for the cable.

19 Claims, 9 Drawing Sheets

STRAIN RELIEF APPARATUS

This application claims benefit of Ser. No. 10 2008 027 380.5, filed 9 Jun. 2008 in Germany and which application is incorporated herein by reference. To the extent appropriate, a claim of priority is made to each of the above disclosed applications.

BACKGROUND OF THE INVENTION

The invention relates to a strain relief apparatus for cables, in particular fiberoptic cables with Kevlar fibers.

In particular in the case of fiberoptic cables with Kevlar fibers (aramid fibers) as mechanical supporting elements there is the problem of mechanically fastening the cable. Cable ties, for example, are used for this purpose or the Kevlar fibers are clamped separately.

SUMMARY OF THE INVENTION

The invention is based on the technical problem of providing an improved strain relief apparatus for cables, in particular fiberoptic cables with Kevlar fibers.

In this regard, the strain relief apparatus for cables, in particular for Kevlar fibers of fiberoptic cables, comprises an outer part and an inner part, the inner part having a receptacle for inserting the Kevlar fibers and a winding region, the inner part being designed to be capable of rotating with respect to the outer part. Capable of rotating in this case generally means that the inner and outer parts are capable of rotating relative to one another, preferably with the outer part being fixed. As a result, the cable is held fixedly in a simple and secure manner. The cable requires a stop, with the result that strain is applied to the Kevlar fibers by means of the winding and the Kevlar fibers are tensioned, which results in the strain relief. The cores or fibers can be of any desired nature, the strain relief of braided Kevlar fibers being a preferred application field. In principle the strain relief apparatus can also be used for braided shields of electrical cables, for example.

In a preferred embodiment, the receptacle is formed by a slot in the upper part of the inner part, which slot merges with a preferably cylindrical bore. The cylindrical bore in this case has the effect that the inserted fibers cannot slide so easily out of the receptacle. The outer part is preferably formed in the region of the slot or the bore likewise with a slot or cut-free portion, so that the fibers can be inserted horizontally. Retainers, which are beveled inwards, are preferably arranged at the slots or cut-free portions of the outer part. The retainers hold the Kevlar fibers down, with the result that they cannot get caught on protruding parts, in particular on the latching device which will be explained further below.

In a further preferred embodiment, the outer part has at least one fixing device, which presses the cable or part of the cable, in particular the Kevlar fibers, against the winding region. As a result, the wound-on Kevlar fibers are prevented from being rotated back and it is ensured that the fibers are wound on more tightly and therefore the required self-locking effect is achieved. The fixing device can be designed to be integral with the outer part or can be designed as a separate component part. The winding region is preferably designed to be conical towards the center of the outer surface.

In a further preferred embodiment, the inner part and the outer part are formed with a latching device which fit one another, it being possible for the number of latching devices of the inner part to be different than the number of latching devices of the outer part. Thus, for example, the outer part can have a latching tab and the inner part can have a large number of latching receptacles for the latching tab of the outer part, or vice versa.

In a further preferred embodiment, the latching device of the inner part is arranged on the circumference of the upper part or on the lower side of the inner part.

In a further preferred embodiment, the outer part comprises at least one element, which protrudes beyond the upper part of the inner part and thus prevents any sliding out.

Further preferably, the upper part of the inner part is formed with cutouts for a tool.

In a further preferred embodiment, the inner part is designed to be additionally translatorial with respect to the outer part. In this case, the translatorial movement of the inner part compensates for the winding length of the fiber, with the result that it is not necessary for a reserve length to be kept in supply prior to the winding operation. The movement can in this case take place, for example, via gearwheels or latching teeth, the outer part being U-shaped in cross section, for example. As a result of the rotation, the inner part then moves additionally into the outer part.

BRIEF DESCRIPTION OF THE DRAWINGS

The invention will be explained in more detail below with reference to a preferred exemplary embodiment. In the figures.

DETAILED DESCRIPTION

Figure 1:
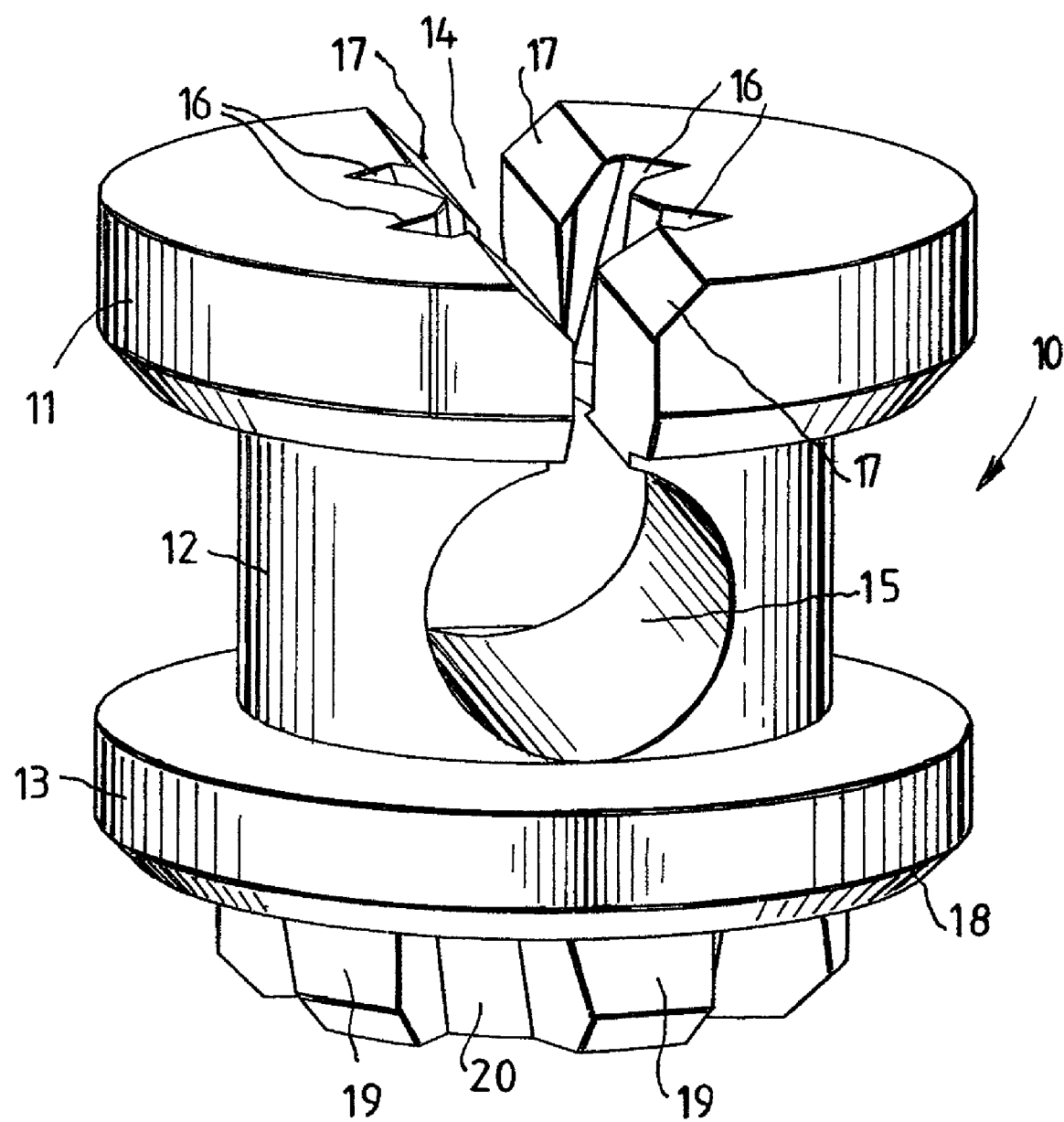
FIG. 1 shows a perspective front view of an inner part of a strain relief apparatus.
Figure 2:
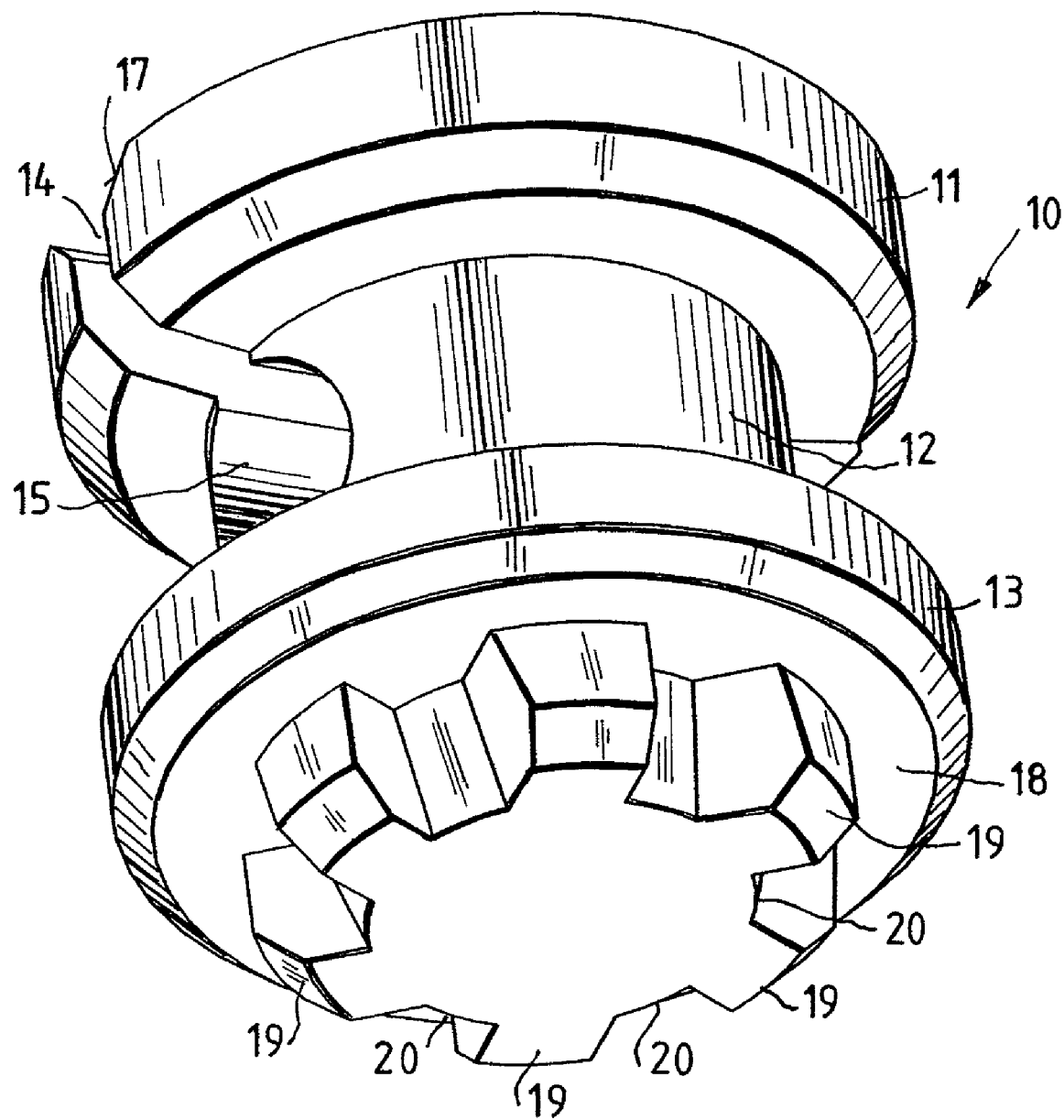
FIG. 2 shows a perspective view from below of the inner part.

FIGS. 1 and 2 show the inner part 10 of a strain relief apparatus. The inner part 10 comprises an upper part 11, a winding region 12 and a lower part 13. A slot 14, which passes centrally over the entire diameter of the circular upper part 11, is introduced into the upper part 11. The slot 14 merges with a cylindrical bore 15, which passes through the winding region 12, the slot 14 and the bore 15 being parallel to one another. Cutouts 16 for a tool, for example a crosshead screwdriver, are provided in the upper part 11 in the region of the slot 14. In order to facilitate insertion of the fibers, the upper part 11 has bevels 17 on the slot 14. Latching tabs 19 are arranged on the lower side 18 of the lower part 13, with latching receptacles 20 being formed between said latching tabs. The winding region 12 can in this case also run conically towards the center of the outer surface, with the result that in the center the diameter is smaller than at the top and at the bottom.

Figure 3:
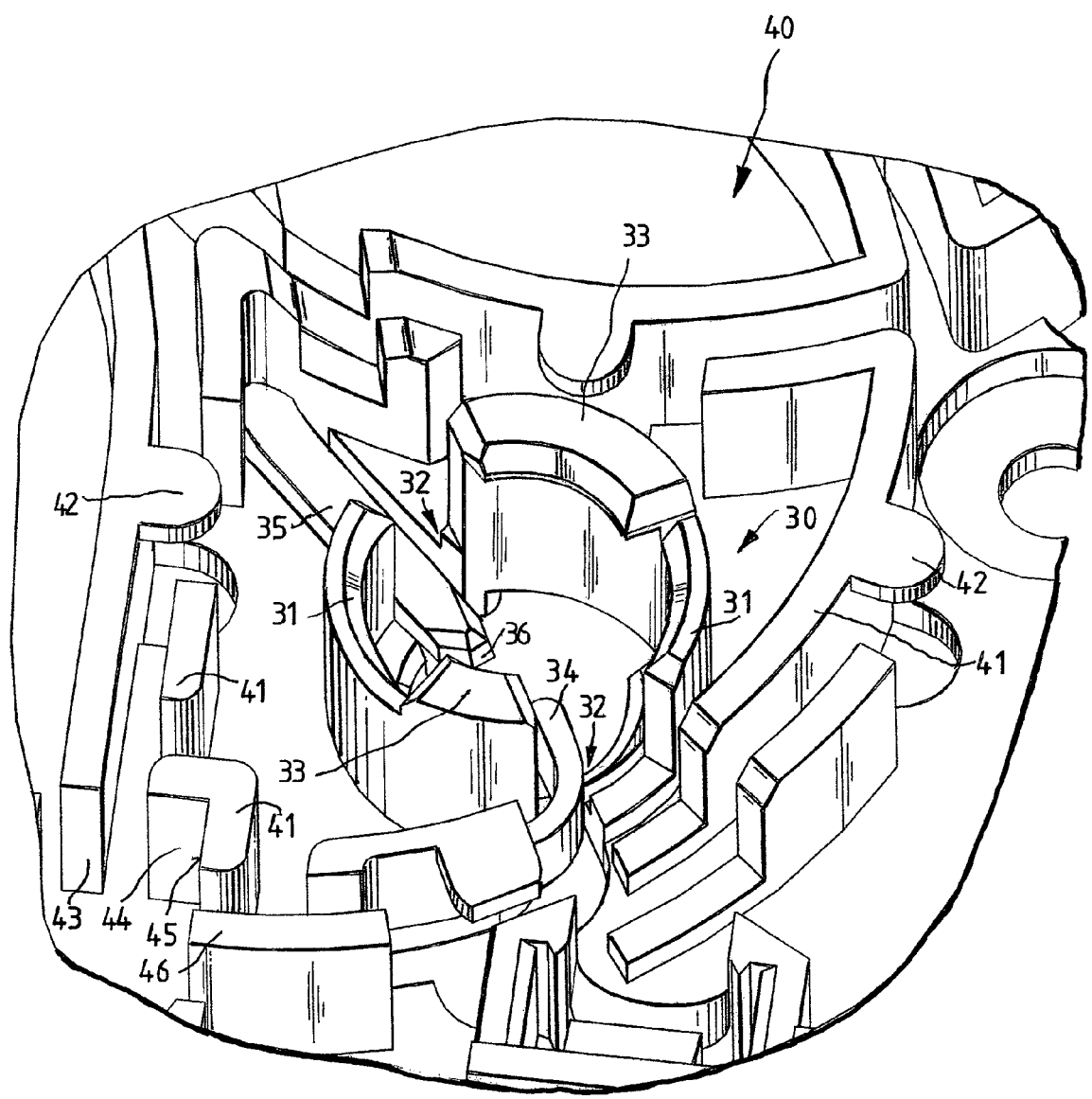
FIG. 3 shows a perspective plan view of an outer part of a strain relief apparatus as a constituent part of a fiberoptic connection module.

FIG. 3 illustrates an outer part 30 of the strain relief apparatus, the outer part 30 being an integral part of a fiberoptic connection module 40. The fiberoptic connection module 40 in this case has various fiber guides 41 and retainers 42. It should be noted here that the strain relief apparatus can also be in the form of a completely separate part. The outer part 30 has walls 31, which form virtually a lateral cylinder surface, which means that this lateral cylinder surface has cut-free portions 32. Two elements 33, which protrude beyond the inner part 10 in the inserted state (see FIG. 4), are arranged on the upper side of the walls 31. Furthermore, the outer part 30 has a fixing device 34 in the form of a sprung web, which protrudes into the interior of the outer part 30 through one cut-free portion 32. The height of the fixing device 34 is selected such that, in the inserted state of the inner part 10, the fixing device 34 presses against the winding region 12 of the inner part 10. Furthermore, the outer part 30 has a latching arm 35, which protrudes via a cut-free portion 32 in the region of the latching tabs 19 or latching receptacles 20 into the outer part 30, the front part forming a latching tab 36, which corresponds to the latching receptacles 20. Depending on the direction from which the cable is inserted, the faces 43 and 44 or 45 and 46 form the stop for the cable. Behind the faces 43, 44 or 45, 46, the cable is then guided without a sheath, the thicker cable sheath stopping against the faces 43-46.

Figure 4:
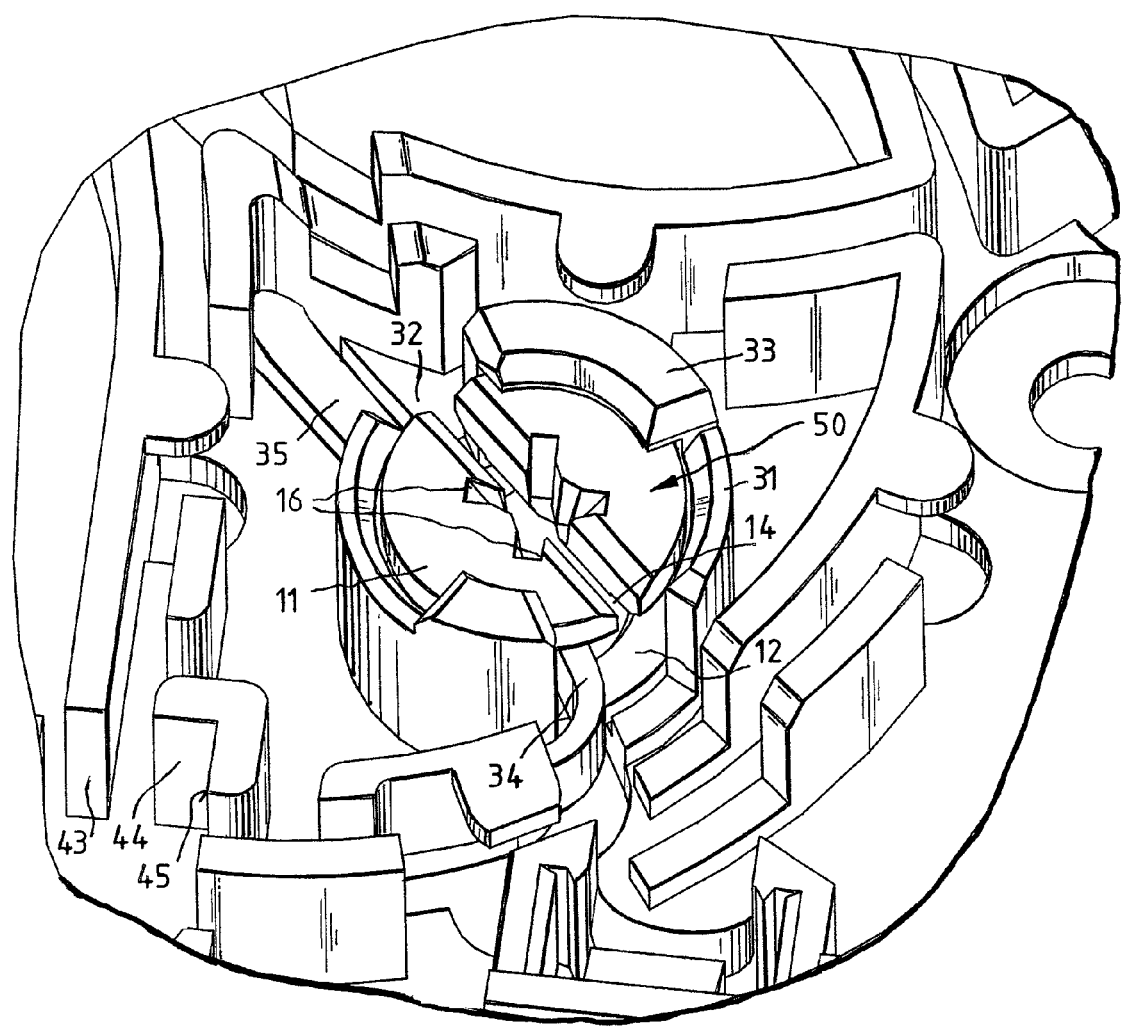
FIG. 4 shows a perspective plan view of the assembled strain relief apparatus.

FIG. 4 shows the assembled strain relief apparatus 50, comprising an inner part 10 and an outer part 30. In the basic position, as illustrated in FIG. 4, the slot 14 is aligned with the cut-free portions 32. The Kevlar fibers can then be inserted through the slot 14 into the cylindrical bore 15. By rotation of the inner part 10 by means of a tool, the fibers are wound onto the winding region 12, the latching tab 36 successively latching into the latching receptacles 20 of the inner part 10 and thus preventing any back-rotation. The fixing element 34 in the process presses the fibers against the winding region 12. Preferably, the inner part 10 performs at least one complete revolution. It should be noted here that in this embodiment the length of the wound-on fibers must be provided in advance as a reserve length since otherwise, as a result of the rotation, the cable would also be drawn in as well.

Figure 5:
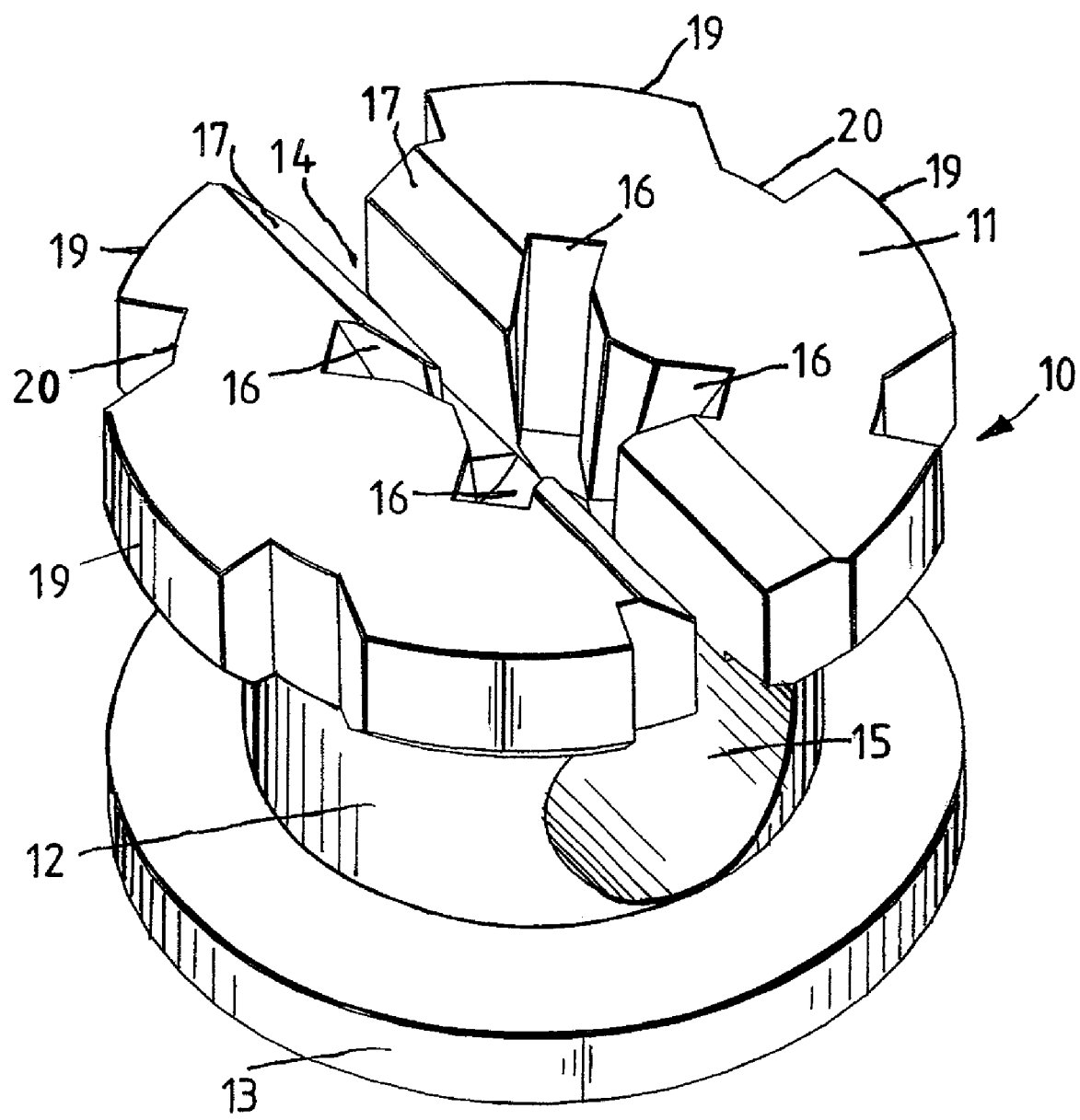
FIG. 5 shows a perspective front view of an inner part in an alternative embodiment.

FIG. 5 illustrates an alternative exemplary embodiment of the inner part 10, with identical reference symbols to those used for the embodiments shown in FIGS. 1 and 2 being used for identical parts. The only difference is the fact that the latching tabs 19 and the latching receptacles 20 are not arranged on the lower side 18 of the lower part 13, but on the circumference of the upper part 11. The outer part 30 is matched correspondingly, which is illustrated in FIG. 6, again with identical parts being provided with identical reference symbols. The difference is that the latching arm 35 is dispensed with and a latching tab 37 is arranged on a wall 31, which then engages in the latching receptacle 20 on the upper part 11. Finally, FIG. 7 illustrates the completely assembled strain relief apparatus 50.

Figure 6:
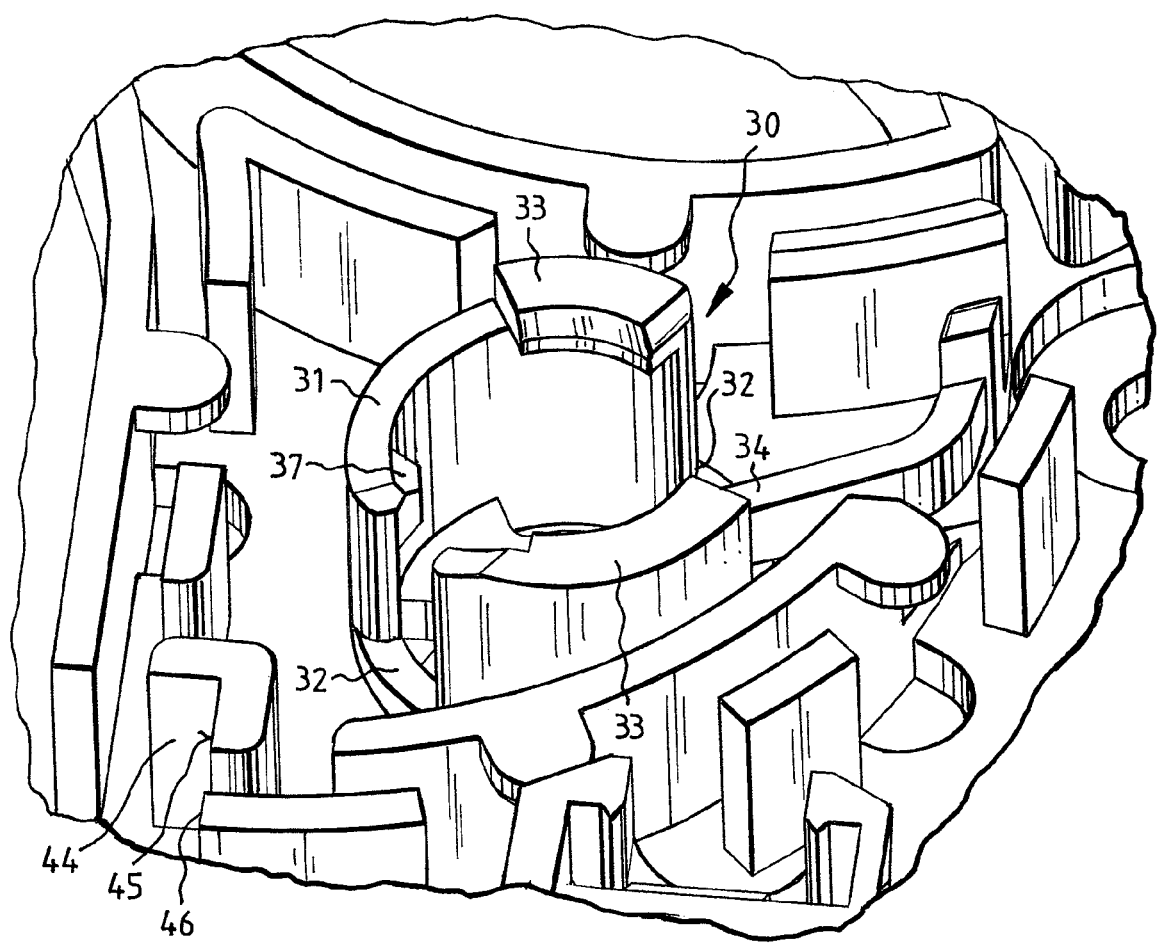
FIG. 6 shows a perspective plan view of an outer part of a strain relief apparatus as a constituent part of a fiberoptic connection module for the alternative embodiment.
Figure 7:
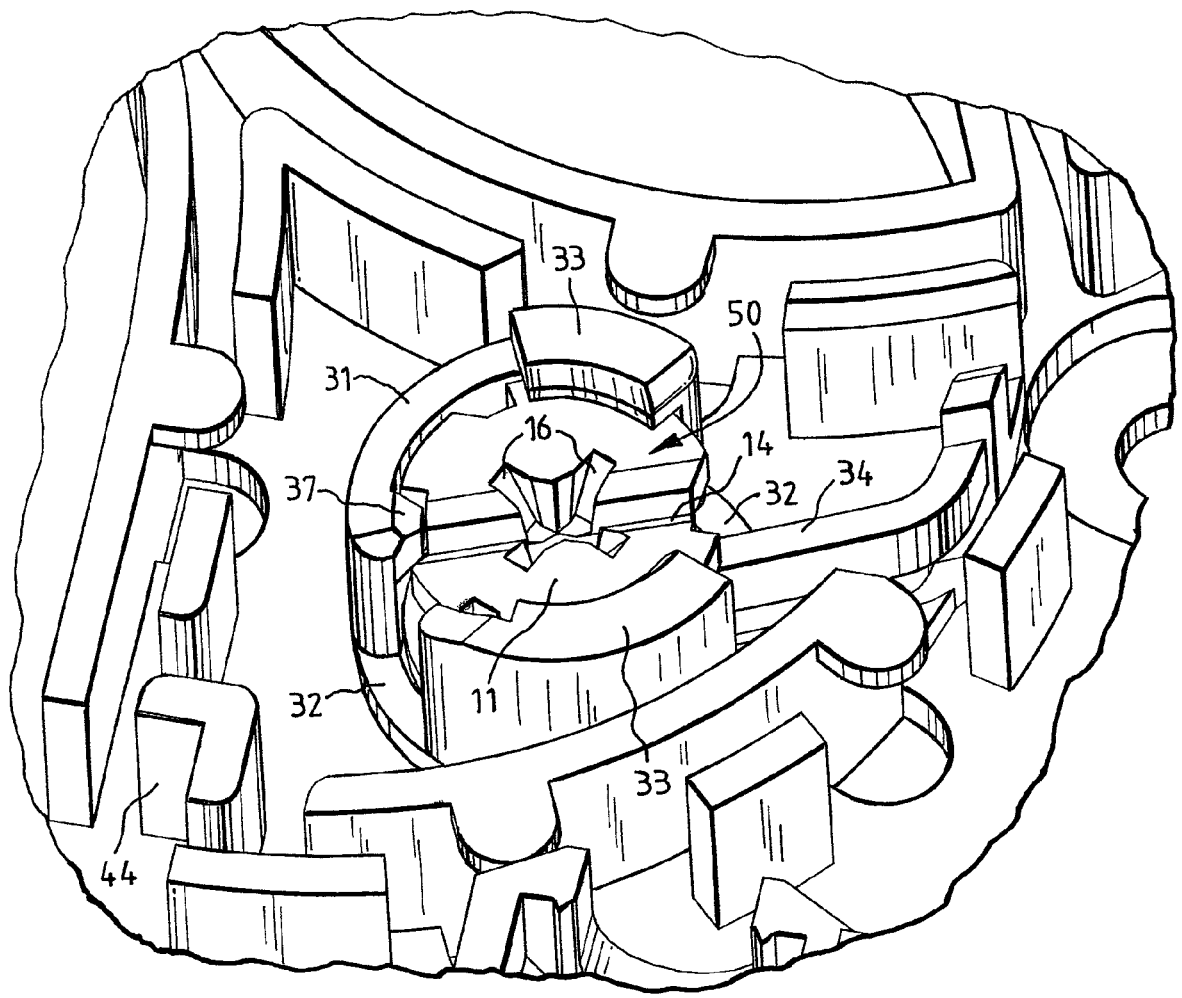
FIG. 7 shows a perspective plan view of the assembled strain relief apparatus of the alternative embodiment.
Figure 8:
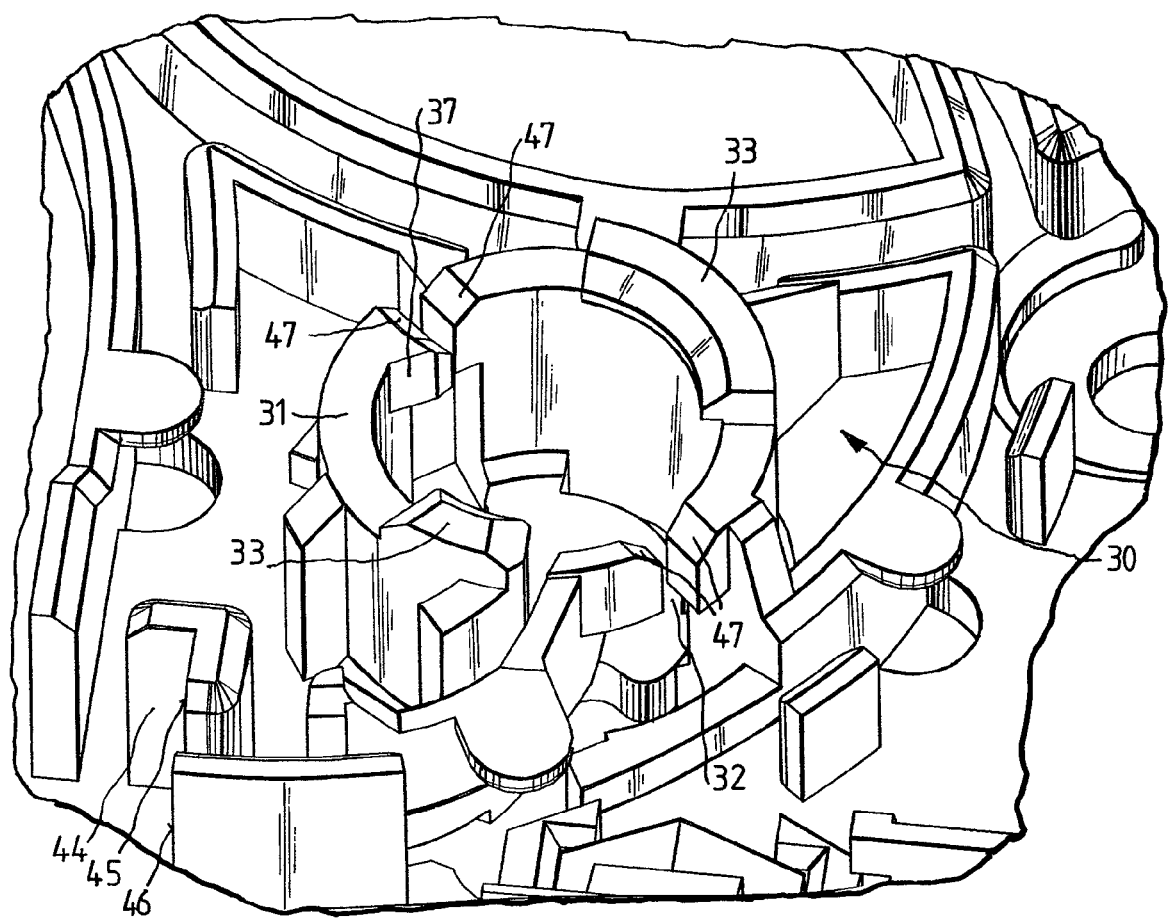
FIG. 8 shows a perspective plan view of an outer part of a strain relief apparatus as a constituent part of a fiberoptic connection module for the alternative embodiment with retainers.

FIG. 8 illustrates an alternative embodiment for the outer part 30 shown in FIG. 6, with identical elements being provided with identical reference symbols. In contrast to FIG. 6, retainers 47, which are designed so as to be beveled inwards towards the cut-free portion 32, are arranged next to one another to the left and right of the cut-free portions 32. As a result of the bevels, the insertion of the Kevlar fibers is facilitated, with the narrow gap between the retainers 47 beneath the bevels preventing the Kevlar fibers from sliding up, with the result that said Kevlar fibers cannot get caught in the latching tabs of the inner part 10. Correspondingly, the fixing device 34 can be dispensed with.

Figure 9:
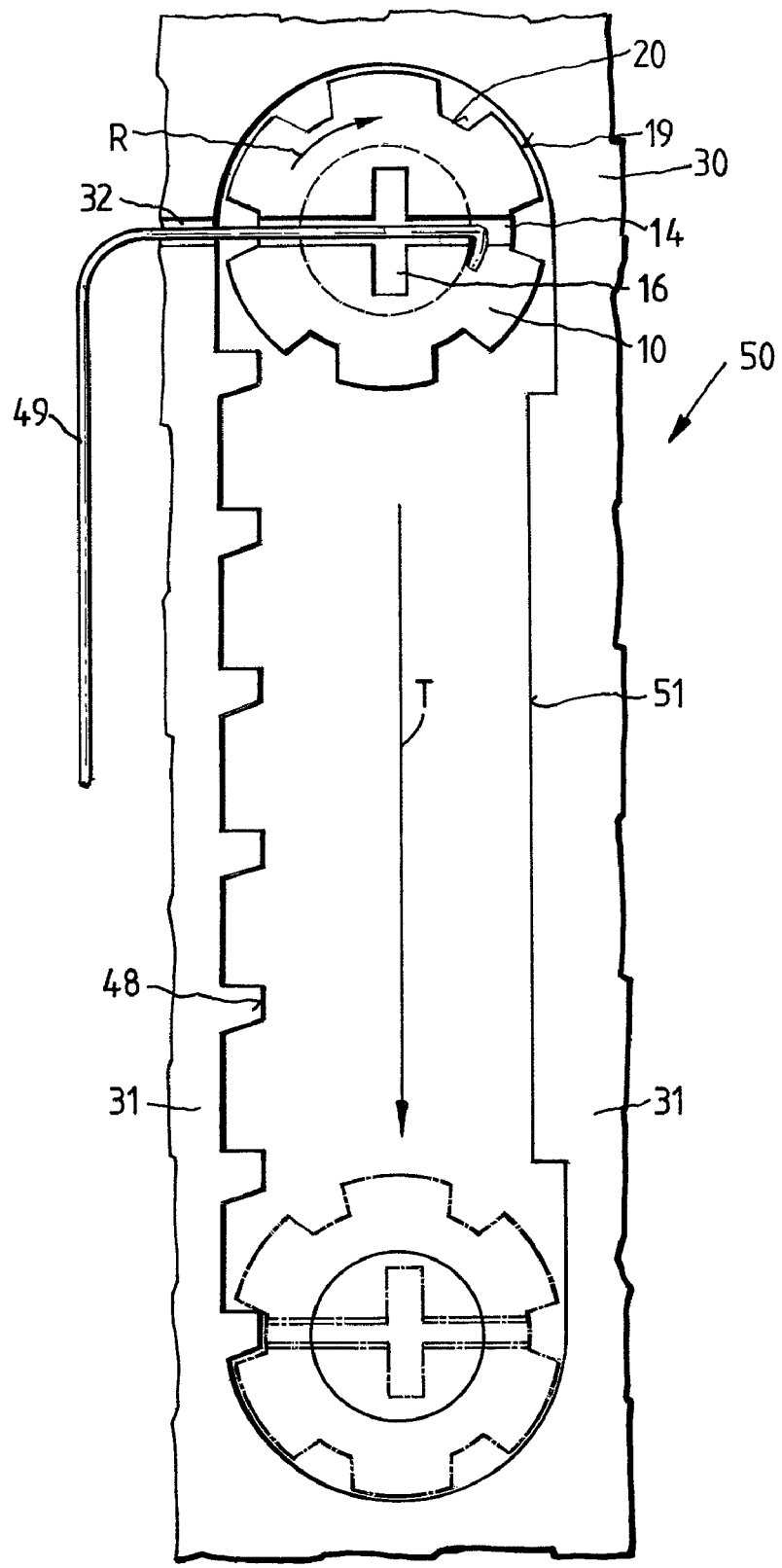
FIG. 9 shows a schematic plan view of a strain relief apparatus with additional translatorial movement between the inner and outer parts.

FIG. 9 illustrates an embodiment of a strain relief apparatus 50 with rotary and translatorial movement of the inner part 10 with respect to the outer part 30. The inner part 10 is designed substantially as illustrated in FIG. 5, with the cutouts 16 being used for receiving a slotted screwdriver. The arrow R indicates the direction of rotation of the inner part 10. The outer part 30 is in the form of a trough, with the result that a depression is formed between the walls 31, with the inner part 10 being located in said depression. The outer part 30 therefore has a substantially U-shaped cross section. Latching teeth 48 are arranged on the inner sides of the left-hand wall 31. In the upper region of the left-hand wall 31, a slot or cut-free portion 32 is illustrated, through which Kevlar fibers 49 can be inserted. The Kevlar fibers 49 are then inserted through the cut-free portion 32 and the slot 14 of the inner part 10. If the inner part 10 is then rotated in the direction R, said inner part rolls with its latching tabs 19 or latching receptacles 20 on the latching teeth 48 of the outer part 30. This rolling movement results in a translatorial movement with the translatorial direction T. The translatorial movement in this case compensates for the shortening of the Kevlar fibers owing to the winding movement around the inner part, with the result that it is not necessary for a reserve length to be retained. The end position of the inner part 10 is in this case illustrated by dashed lines. In FIG. 9, the latching teeth 48 are designed so as to be unsymmetrical in order to prevent the inner part 10 from sliding back. In this case, the upper flank of the latching teeth 48 is set at a steeper angle (virtually 90°) than the lower flank. Alternatively, further structure for securing the inner part 10 can also be provided which prevent it from automatically rotating back. Furthermore, structure can be provided which, corresponding to the elements 33 (see, for example, FIG. 8), prevent a linear movement of the inner part 10. In this case, this is a cover 51 covering at least partially the depression of the outer part 30.

LIST OF REFERENCE SYMBOLS

10 Inner part
11 Upper part
12 Winding region
13 Lower part
14 Slot
15 Bore
16 Cutouts
17 Bevels
18 Lower side
19 Latching tabs
20 Latching receptacles
30 Outer part
31 Walls
32 Cut-free portions
33 Elements
34 Fixing device
35 Latching arm
36 Latching tab
37 Latching tab
40 Fiberoptic connection module
41 Fiber guides
42 Retainer
43 Face
44 Face
45 Face
46 Face
47 Retainer 48 Latching teeth
49 Kevlar fibers
50 Strain relief apparatus
51 Cover
R Rotational direction
T Translatorial direction

The invention claimed is:

1. A strain relief apparatus for fiber optic cables with Kevlar fibers, the strain relief apparatus comprising:
   an outer part defining a hollow space and including at least a first latching tab; and
   an inner part configured to be disposed in the hollow space of the outer part, the inner part having a receptacle configured to receive the Kevlar fibers and a winding region, the inner part being designed to be capable of rotating with respect to the outer part, the inner part also including a plurality of second latching tabs that are each configured to fit with the first latching tab of the outer part to hold the inner part in a rotationally fixed position relative to the outer part, wherein the second latching tabs define a symmetric laterally cross-sectional profile.

2. The strain relief apparatus as claimed in claim 1, wherein the inner part has an upper part at one end of the winding region and a lower part at an opposite end of the winding region, the receptacle being formed by a slot defined in the upper part of the inner part, which slot merges with a bore defined through the winding region.

3. The strain relief apparatus as claimed in claim 1, wherein the outer part is formed with at least one slot or cut-free portion.

4. The strain relief apparatus as claimed in claim 3, wherein retainers are arranged at the slot or cut-free portion.

5. The strain relief apparatus as claimed in claim 1, wherein the outer part has at least one fixing device, which presses the cable against the winding region.

6. The strain relief apparatus as claimed in claim 1, wherein the latching device of the inner part is arranged on one of a circumference of an upper part or on a lower side of the inner part.

7. The strain relief apparatus as claimed claim 1, wherein the outer part comprises elements, which protrude beyond an upper part of the inner part.

8. The strain relief apparatus as claimed claim 1, wherein an upper part of the inner part is formed with cutouts for a tool.

9. The strain relief apparatus as claimed claim 1, wherein the inner part is designed to be additionally translatorial with respect to the outer part.

10. The strain relief apparatus as claimed claim 1, wherein the outer part includes side walls defining an open top providing access to the hollow space in which the inner part is disposed.

11. The strain relief apparatus as claimed claim 10, wherein the strain relief apparatus includes a stop for a sheath of the cable, the stop being external to the side walls of the outer part.

12. A strain relief apparatus for fiber optic cables with Kevlar fibers, the strain relief apparatus comprising:
    a spool body including a winding region extending along a longitudinal axis between a lower part and an upper part, the winding region having a reduced diameter relative to the upper and lower parts, the spool body defining a bore extending laterally through the winding region along an axis perpendicular to the longitudinal axis, the upper part defining a slot providing access to the bore, the spool body including at least one latching tab.

13. The strain relief apparatus of claim 12, wherein the upper part defines tool cutouts.

14. The strain relief apparatus of claim 12, wherein the at least one latching tab is disposed at the lower part.

15. The strain relief apparatus of claim 12, wherein the at least one latching tab is disposed at the upper part.

16. The strain relief apparatus of claim 12, wherein the at least one latching tab includes a plurality of latching tabs.

17. A connection module comprising:
    a base;
    at least one guide wall disposed on the base, the guide wall being configured to receive and guide an optical fiber;
    a strain relief well disposed on the base adjacent the guide wall, the strain relief well including an annular sidewall defining first and second cutouts and a retention member extending inwardly from the sidewall, the strain relief well also including a flexible fixing member extending inwardly from the first cutout, the strain relief well also including an inwardly extending latching tab.

18. The connection module of claim 17, wherein the latching tab extends inwardly at a bottom of the second cutout.

19. The connection module of claim 17, wherein the latching tab extends inwardly from a top of the sidewall adjacent the second cutout.

* * * * *